(12) United States Patent
Asif Bashir et al.

(10) Patent No.: US 11,508,401 B1
(45) Date of Patent: Nov. 22, 2022

(54) MAGNETIC RECORDING DEVICES HAVING CROSS-TRACK CURRENT FLOW TO FACILITATE DOWNTRACK MAGNETIC FIELD ENHANCEMENTS

(71) Applicant: Western Digital Technologies, Inc., San Jose, CA (US)

(72) Inventors: Muhammad Asif Bashir, San Jose, CA (US); Petrus Antonius Van Der Heijden, Cupertino, CA (US); James Terrence Olson, San Jose, CA (US); Alexander Goncharov, Morgan Hill, CA (US); Zhigang Bai, Fremont, CA (US); Yunfei Ding, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/183,155

(22) Filed: Feb. 23, 2021

Related U.S. Application Data

(60) Provisional application No. 63/094,724, filed on Oct. 21, 2020.

(51) Int. Cl.
*G11B 11/105* (2006.01)
*G11B 5/31* (2006.01)

(52) U.S. Cl.
CPC ............ *G11B 5/3116* (2013.01); *G11B 5/315* (2013.01)

(58) Field of Classification Search
CPC ..... G11B 5/3133; G11B 5/115; G11B 5/1877; G11B 5/23; G11B 5/315; G11B 5/012;
(Continued)

(56) References Cited

U.S. PATENT DOCUMENTS 6,201,653 B1 3/2001 Contreras et al.
7,212,367 B2 5/2007 Clinton et al.
(Continued)

FOREIGN PATENT DOCUMENTS

| CN | 104835510 B | 11/2017 |
|---|---|---|
| JP | 2013251042 A | 12/2013 |
| WO | 2015126326 A1 | 8/2015 |

OTHER PUBLICATIONS

Katayama, Takuto et al., "Model Analysis of Tilted Spin-Torque Oscillator With Magnetic Write Head for Shingled Microwave-Assisted Magnetic Recording", IEEE Transactions on Magnetics, vol. 50, No. 11, Nov. 2014.
(Continued)

*Primary Examiner* — Nabil Z Hindi
(74) *Attorney, Agent, or Firm* — Patterson & Sheridan, LLP; Steven H. VerSteeg

(57) ABSTRACT

Aspects of the present disclosure generally relate to a magnetic recording head of a magnetic recording device that facilitates generating a downtrack magnetic bias field to enhance writing. During magnetic writing using the magnetic recording head, a bias current is directed in a cross-track direction on the trailing side of the main pole. Bias current flowing in the cross-track direction on a leading side of the main pole is reduced or eliminated. The bias current flowing in the cross-track direction on the trailing side of the main pole facilitates generating a magnetic field in a downtrack direction. The magnetic field in the downtrack direction is a bias field generated using the bias current. The magnetic bias field in the downtrack direction facilitates enhanced writing performance and increased areal density capability (ADC) for magnetic recording.

21 Claims, 7 Drawing Sheets

(58) Field of Classification Search
CPC ......... G11B 5/02; G11B 5/1278; G11B 5/235; G11B 5/316; G11B 5/3143; G11B 5/3146; G11B 11/105; G11B 11/10506; G11B 11/10; G11B 11/1051; G11B 2005/0021
USPC .................. 360/59, 328; 369/13.33, 13.32
See application file for complete search history.

(56) References Cited

U.S. PATENT DOCUMENTS

| | | | |
|---|---|---|---|
| 7,593,184 B2 | 9/2009 | Clinton et al. | |
| 7,724,469 B2 | 5/2010 | Gao et al. | |
| 7,848,054 B2* | 12/2010 | Hsiao | G11B 5/3163 360/125.09 |
| 8,179,747 B1 | 5/2012 | Mugino et al. | |
| 8,411,390 B2 | 4/2013 | Franca-Neto et al. | |
| 8,472,135 B1 | 6/2013 | Kusukawa et al. | |
| 8,547,656 B2 | 10/2013 | Igarashi et al. | |
| 8,547,661 B2 | 10/2013 | Bai | |
| 8,582,240 B1 | 11/2013 | Chen et al. | |
| 8,724,242 B2 | 5/2014 | Gao | |
| 8,737,006 B2 | 5/2014 | Livshitz et al. | |
| 8,929,030 B2 | 1/2015 | Hou et al. | |
| 8,988,826 B2 | 3/2015 | Sugiyama et al. | |
| 8,995,088 B1 | 3/2015 | Boone et al. | |
| 9,001,465 B1 | 4/2015 | Shimizu et al. | |
| 9,230,571 B1 | 1/2016 | Chen et al. | |
| 9,275,672 B2 | 3/2016 | Shiroishi et al. | |
| 9,355,655 B1 | 5/2016 | Udo et al. | |
| 9,368,135 B2 | 6/2016 | Gao | |
| 9,478,242 B1 | 10/2016 | Liu et al. | |
| 9,691,416 B1 | 6/2017 | Izawa et al. | |
| 9,792,933 B2 | 10/2017 | Koizumi et al. | |
| 9,881,637 B1 | 1/2018 | Wilson et al. | |
| 10,121,497 B1 | 11/2018 | Takahashi et al. | |
| 10,181,334 B1 | 1/2019 | Song et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,388,305 B1 | 8/2019 | De Albuquerque et al. | |
| 10,446,178 B1 | 10/2019 | Tang et al. | |
| 10,580,441 B1 | 3/2020 | Chen et al. | |
| 10,593,355 B1* | 3/2020 | Basu | G11B 5/112 |
| 10,706,876 B1 | 7/2020 | Rausch et al. | |
| 10,777,219 B1 | 9/2020 | Asif Bashir et al. | |
| 10,861,485 B1 | 12/2020 | Asif Bashir et al. | |
| 10,891,974 B1 | 1/2021 | Chembrolu et al. | |
| 10,957,348 B2 | 3/2021 | Bai et al. | |
| 10,991,390 B2 | 4/2021 | Kobayashi | |
| 2008/0205202 A1 | 8/2008 | Komura et al. | |
| 2008/0239541 A1 | 10/2008 | Shimazawa et al. | |
| 2008/0304176 A1 | 12/2008 | Takagishi et al. | |
| 2009/0059423 A1 | 3/2009 | Yamada et al. | |
| 2009/0152119 A1* | 6/2009 | Tachibana | G11B 5/315 205/127 |
| 2009/0310244 A1 | 12/2009 | Shimazawa et al. | |
| 2013/0114384 A1 | 5/2013 | Mochizuki et al. | |
| 2013/0250456 A1 | 9/2013 | Yamada et al. | |
| 2014/0139952 A1 | 5/2014 | Takeo et al. | |
| 2014/0177092 A1 | 6/2014 | Katada et al. | |
| 2014/0177100 A1 | 6/2014 | Sugiyama et al. | |
| 2015/0092292 A1 | 4/2015 | Furukawa et al. | |
| 2016/0027455 A1 | 1/2016 | Kudo et al. | |
| 2016/0118065 A1 | 4/2016 | Chen et al. | |
| 2017/0092304 A1 | 3/2017 | Koizumi et al. | |
| 2017/0236537 A1 | 8/2017 | Murakami et al. | |
| 2018/0268848 A1 | 9/2018 | Narita et al. | |
| 2019/0088274 A1 | 3/2019 | Narita et al. | |

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

Koga, R. et al., "Increasing AC-Field Frequency in Microwave-Assisted Magnetic Recording", Intermag, 2015.

Zhu, Jian-Gang et al., "Microwave Assisted Magnetic Recording Utilizing Perpendicular Spin Torque Oscillator With Switchable Perpendicular Electrodes", IEEE Transactions on Magnetics, vol. 46, No. 3, Mar. 2010, pp. 751-757.

Ludeman "Three Technologies That Make HDD Magic—Western Digital Blog." Western Digital Corporate Blog, published on Jul. 16, 2020 in Tech & Products, 7 pages, https://blog.westerndigital.com/hdd-magic-20tb-18tb/.

* cited by examiner

MAGNETIC RECORDING DEVICES HAVING CROSS-TRACK CURRENT FLOW TO FACILITATE DOWNTRACK MAGNETIC FIELD ENHANCEMENTS

CROSS-REFERENCE TO RELATED APPLICATIONS

This application claims benefit of U.S. provisional patent application Ser. No. 63/094,724, filed Oct. 21, 2020, which is herein incorporated by reference.

BACKGROUND OF THE DISCLOSURE

Field of the Disclosure

Aspects of the present disclosure generally relate to a magnetic recording head of a magnetic recording device that facilitates generating a downtrack magnetic bias field, such as a write head of a data storage device, for example a magnetic media drive.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

Another challenge for HDD designs where a write current is applied through a write head to write data to media is that higher amounts of write current can cause a temperature of the write head to increase, which can cause degradation such as at a media facing surface (MFS). The degradation can hinder performance and reliability of the write head, and can even render the write head inoperable. However, lowering write currents can limit writing fields.

As discussed, writing performance can be limited for data storage devices. Therefore, there is a need for write heads that simply and effectively facilitate write head performance reliability, enhanced magnetic writing, high areal density capability (ADC) of magnetic recording, and reduced jitter.

SUMMARY OF THE DISCLOSURE

Aspects of the present disclosure generally relate to a magnetic recording head of a magnetic recording device that facilitates generating a downtrack magnetic bias field to enhance writing. During magnetic writing using the magnetic recording head, a bias current is directed in a cross-track direction on the trailing side of the main pole. Bias current flowing in the cross-track direction on a leading side of the main pole is reduced or eliminated. The bias current flowing in the cross-track direction on the trailing side of the main pole facilitates generating a magnetic field in a downtrack direction. The magnetic field in the downtrack direction is a bias field generated using the bias current. The magnetic bias field in the downtrack direction facilitates enhanced writing performance and increased areal density capability (ADC) for magnetic recording. In one embodiment, the magnetic bias field is an alternating current (AC) bias field that is driven in a range of 0 GHz to 25 GHz using an external AC source.

In one implementation, a magnetic recording head includes a main pole, a first side shield disposed on a first side of the main pole, a second side shield disposed on a second side of the main pole, and a trailing shield disposed on a trailing side of the main pole. The magnetic recording head also includes a first side gap layer disposed on the first side of the main pole and between the main pole and the first side shield. The first side gap layer includes a first lead. The magnetic recording head also includes a first side insulation layer disposed on the first side of the main pole and between the main pole and the first side gap layer. The magnetic recording head also includes a second side gap layer disposed on the second side of the main pole and between the main pole and the second side shield. The second side gap layer includes a second lead. The magnetic recording head also includes a second side insulation layer disposed on the second side of the main pole and between the main pole and the second side gap layer.

In one implementation, a magnetic recording head includes a main pole, a first side shield disposed on a first side of the main pole, a second side shield disposed on a second side of the main pole, and a trailing shield disposed on a trailing side of the main pole. The magnetic recording head also includes a first side gap layer disposed on the first side of the main pole, a first side insulation layer disposed on the first side of the main pole and between the first side gap layer and the first side shield, and a second side gap layer disposed on the second side of the main pole. The magnetic recording head also includes a second side insulation layer disposed on the second side of the main pole and between the second side gap layer and the second side shield.

In one implementation, a magnetic recording head includes a main pole, a first side shield disposed on a first side of the main pole, and a second side shield disposed on a second side of the main pole. The magnetic recording head also includes a trailing shield disposed on a trailing side of the main pole, and one or more side gap layers disposed on the first side of the main pole and the second side of the main pole. The magnetic recording head also includes one or more side insulation layers disposed on the first side of the main pole and the second side of the main pole, and a nonmagnetic spacer layer disposed on the trailing side of the main pole and between the main pole and the trailing shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to a magnetic recording head of a magnetic recording device that facilitates generating a downtrack magnetic bias field to enhance writing. During magnetic writing using the magnetic recording head, a bias current is directed in a cross-track direction on the trailing side of the main pole. Bias current flowing in the cross-track direction on a leading side of the main pole is reduced or eliminated. The bias current flowing in the cross-track direction on the trailing side of the main pole facilitates generating a magnetic field in a downtrack direction. The magnetic field in the downtrack direction is a bias field generated using the bias current. The magnetic bias field in the downtrack direction facilitates enhanced writing performance and increased areal density capability (ADC) for magnetic recording. The bias current is supplied independently of a primary current (a write current) that is used to write magnetic media, and the bias field generated is generated independently of a primary field (a write field) that is used to write magnetic media. In one embodiment, the magnetic bias field is an alternating current (AC) bias field that is driven in a range of 0 GHz to 25 GHz using an external AC source.

Aspects of the present disclosure relate to data storage devices using an energy-assisted magnetic recording (EAMR) write head.

Figure 1:
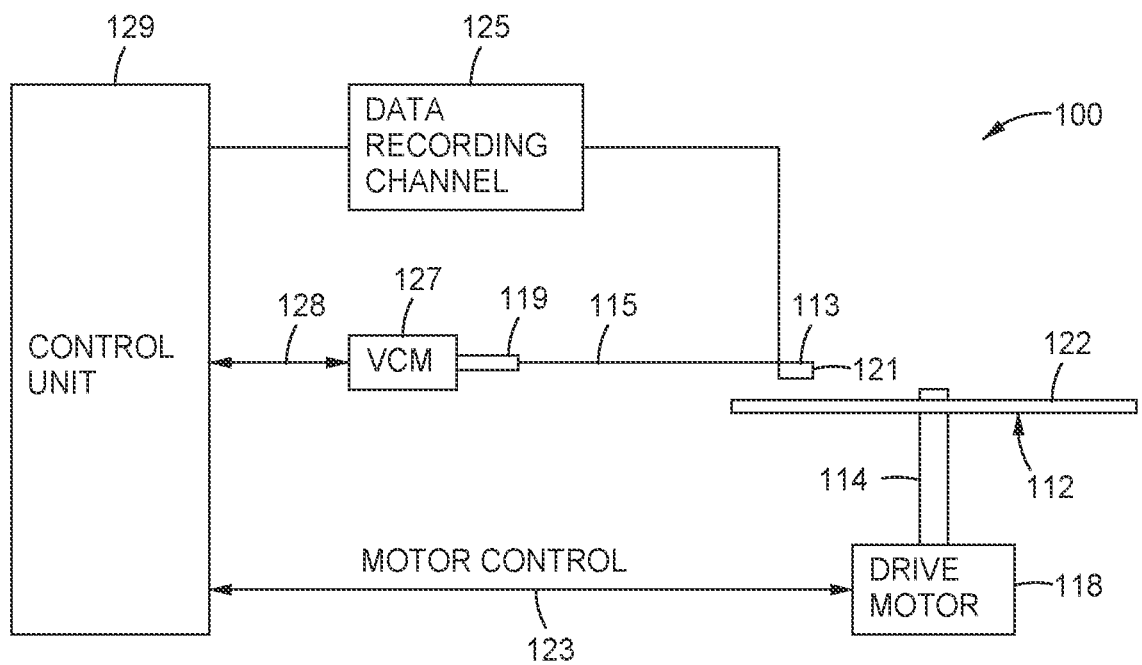
FIG. 1 illustrates a schematic view of a disk drive, according to one implementation.

FIG. 1 illustrates a schematic view of a disk drive 100, according to one implementation. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the magnetic media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the magnetic media 112. The AC magnetic field generated from the magnetic head assembly 121 is a bias field generated using a bias current supplied using an external AC source. The bias field facilitates enhanced writing performance of a write field generated using the write current.

The various components of the disk drive 100 are controlled in operation by control signals generated by the control unit 129, such as access control signals and internal clock signals. The control unit 129 can include logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on the magnetic media 112. Write and read signals are communicated to and from write and read heads on the magnetic head assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
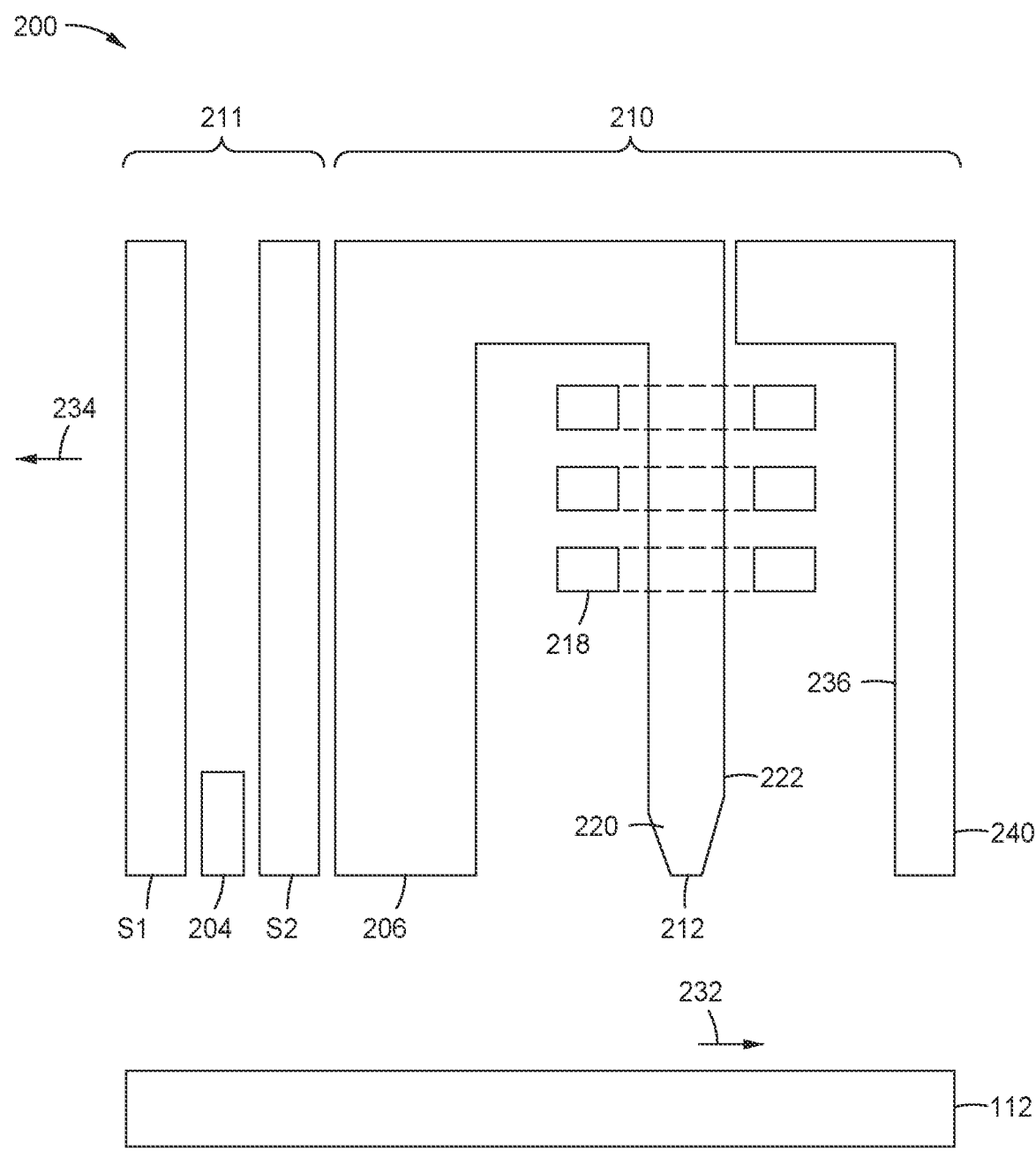
FIG. 2 is a fragmented and schematic cross-sectional side view through a center of a read/write head facing the magnetic media, according to one implementation.

FIG. 2 is a fragmented and schematic cross-sectional side view through a center of a read/write head 200 facing the magnetic media 112, according to one implementation. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 such that the read/write head 200 moves relative to the magnetic media 112 in the direction indicated by the arrow 234.

In one embodiment, which can be combined with other embodiments, the magnetic read head 211 is a magnetoresistive (MR) read head that includes an MR sensing element 204 located between MR shields S1 and S2. In one embodiment, which can be combined with other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap and a leading gap may be in contact with the main pole, and a leading shield may be in contact with the leading gap. A recording magnetic field (e.g., a write field or a primary field) is generated from the main pole 220 and the trailing shield 240 facilitates making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, which can be combined with other embodiments, the main pole 220 has a saturated magnetization (Ms) of 2.4 T and a thickness of about 300 nanometers (nm). The trailing shield 240 may be a magnetic material such as NiFe alloy. In one embodiment, which can be combined with other embodiments, the trailing shield 240 has an Ms of about 1.2 T.

Figure 3A:
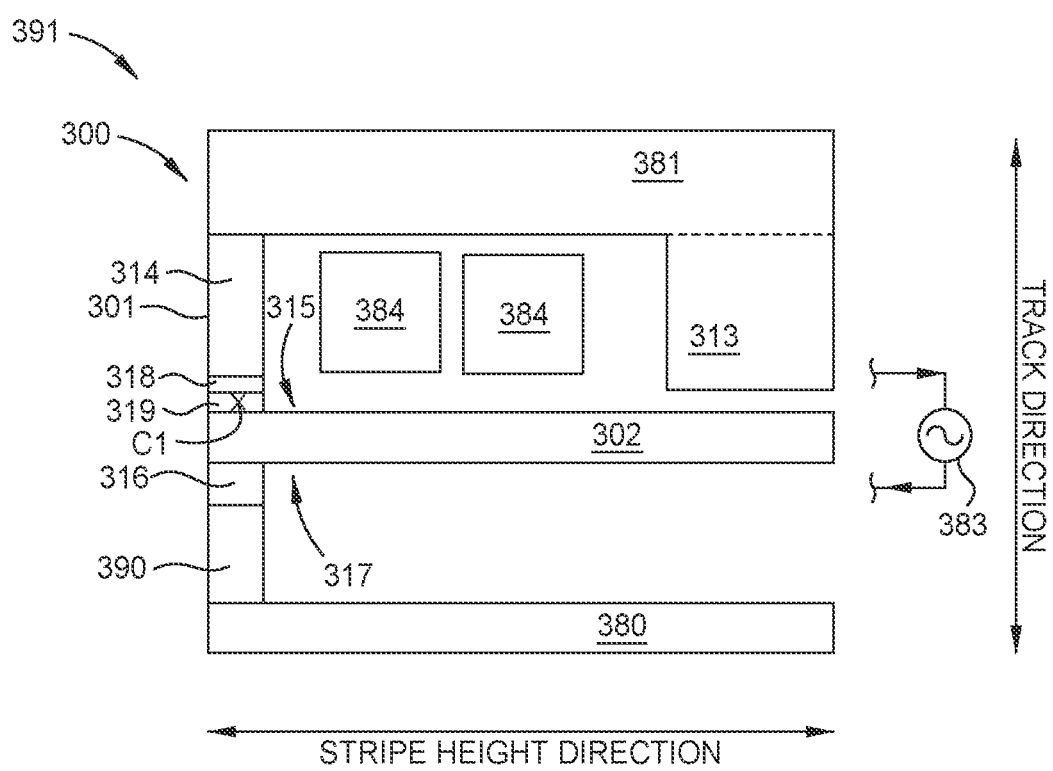
FIG. 3A is a schematic cross-sectional throat view of a magnetic recording head assembly having a magnetic recording head, according to one implementation.

FIG. 3A is a schematic cross-sectional throat view of a magnetic recording head assembly 391 having a magnetic recording head 300, according to one implementation. The magnetic recording head assembly 310 may be used in a magnetic recording device, such as a hard disk drive (HDD). In one embodiment, which can be combined with other embodiments, the magnetic recording head assembly 310 is used as at least part of the write head 210 shown in FIG. 2.

The magnetic recording head 300 includes a lower pole 380, an upper pole 381, and a main pole 302 between the upper pole 381 and the lower pole 380. The magnetic recording head 300 also includes a leading shield 390 on a leading side 317 of the main pole 302, and a trailing shield 314 on a trailing side 315 of the main pole 302. The magnetic recording head 300 includes a nonmagnetic spacer layer 319 and a hot seed 318 between the main pole 302 and the trailing shield 314. The magnetic recording head 300 includes a media facing surface (MFS) 301, such as an air bearing surface (ABS). The nonmagnetic spacer layer 319 and the hot seed 318 extend to the MFS 315.

Figure 3B:
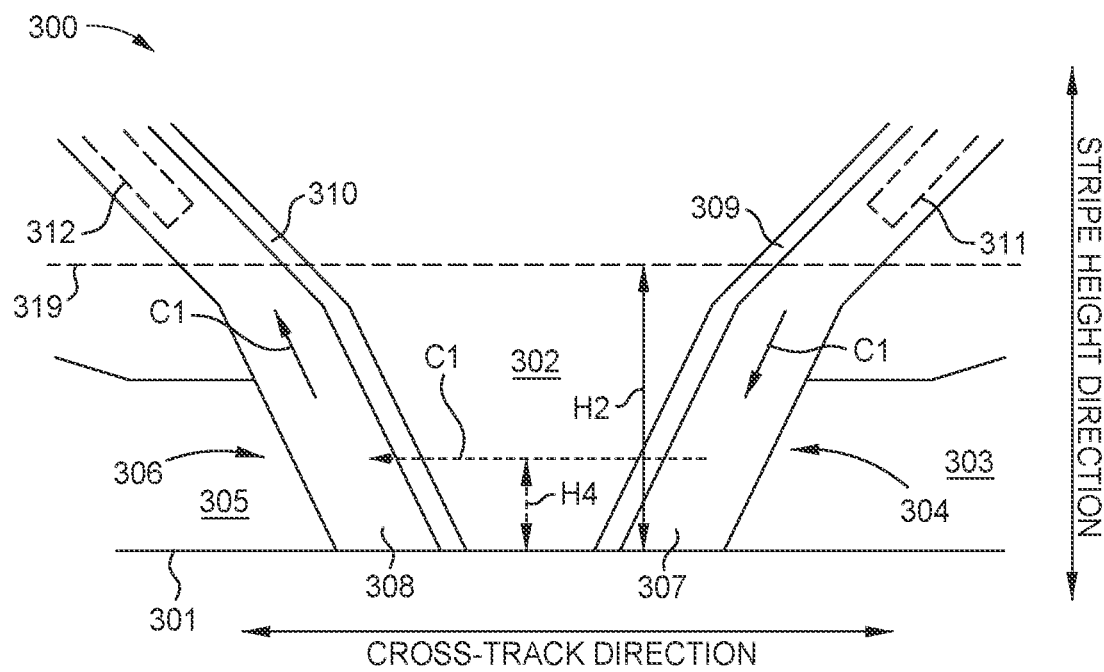
FIG. 3B is a schematic cross-track cross-sectional view of the magnetic recording head shown in FIG. 3A, according to one implementation.

The magnetic recording head assembly 310 also includes an alternating current (AC) source 383 coupled to a first side gap layer 307 and a second side gap layer 308 (shown in FIG. 3B) through a first lead 311 and a second lead 312 (shown in FIG. 3B). The AC source 383 supplies current to the first lead 311 and receives current from the second lead 312. The current is supplied during writing operations using the main pole 302. In one embodiment, which can be combined with other embodiments, the upper pole 302 includes a ledge 313 that protrudes from the upper pole 381 and toward the main pole 302. The magnetic recording head 300 includes a coil structure 384. The coil structure 384 can be a "pancake" structure that winds around the trailing side 315 of the main pole 302, or can be a "helical" structure that winds around the main pole 302. The AC source 383 is disposed externally to the magnetic recording head 300, in one embodiment. The AC source 383 is disposed externally to the lower pole 380, the main pole 302, and the upper pole 381, in one embodiment. The AC source 383 is disposed externally to the hot seed 318, the nonmagnetic spacer layer 319, the leading shield 390, and the trailing shield 314, in one embodiment. In another embodiment, the AC source 383 is disposed externally to a hat of the writer head device of which the magnetic recording head 300 is a part.

The present disclosure contemplates that a direct current (DC) source may be used in place of the AC source 383 to supply current to the first lead 311 and receive current from the second lead 312.

FIG. 3B is a schematic cross-track cross-sectional view of the magnetic recording head 300 shown in FIG. 3A, according to one implementation. The magnetic recording head 300 may be used in a magnetic recording device, such as a hard disk drive (HDD). In one embodiment, which can be combined with other embodiments, the magnetic recording head 300 is used at least as part of the write head 210 shown in FIG. 2.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

The magnetic recording head 300 includes a first side shield 303 disposed on a first side 304 of the main pole 302, and a second side shield 305 disposed on a second side 306 of the main pole 302. A first side gap layer 307 is disposed on the first side 304 and between the main pole 302 and the first side shield 303. A second side gap layer 308 is disposed on the second side 306 and between the main pole 302 and the second side shield 305. A first side insulation layer 309 is disposed on the first side 304 of the main pole 302 and between the main pole 302 and the first side gap layer 307. A second side insulation layer 310 disposed on the second side 306 of the main pole 302 and between the main pole 302 and the second side gap layer 308. The first side insulation layer 309 and the second side insulation layer 310 extend to the media facing surface 301 along a stripe height direction of the magnetic recording head 300. Each of the first side insulation layer 309 and the second side insulation layer 310 is formed of an insulation material. The insulation material includes one or more of an aluminum oxide (AlO), a silicon nitride (SiN), and/or a tantalum nitride (TaN).

Each of the first side gap layer 307 and the second side gap layer 308 is formed of one or more of ruthenium (Ru), chromium (Cr), tantalum (Ta), gold (Au), copper (Cu), nickel-chrome (NiCr), nickel-aluminum (NiAl), nickel-tantalum (NiTa), and/or nickel-iron-tantalum (NiFeTa). The first side gap layer 307 includes the first lead 311 that is coupled to and/or formed at least partially in the first side gap layer 307. The second side gap layer 308 includes the second lead 312 that is coupled to and/or formed at least partially in the second side gap layer 308.

In FIG. 3B, current C1 (described below) flowing along the cross-track direction is shown in ghost because the current C1 flowing along the cross-track direction is flowing on trailing sides of the main pole 302, the first side insulation layer 309, and the second side insulation layer 310. The current C1 flows along the cross-track direction at a height H4 relative to the MFS 301 that is equal to or lesser than the height H2 (described below) of the nonmagnetic spacer layer 319, thereby closing the current loop at the height H4 that is equal to or lesser than the height H2.

In FIG. 3A, the flow of the current C1 is denoted with an "X" as the current C1 is flowing into the page in FIG. 3A.

Figure 3C:
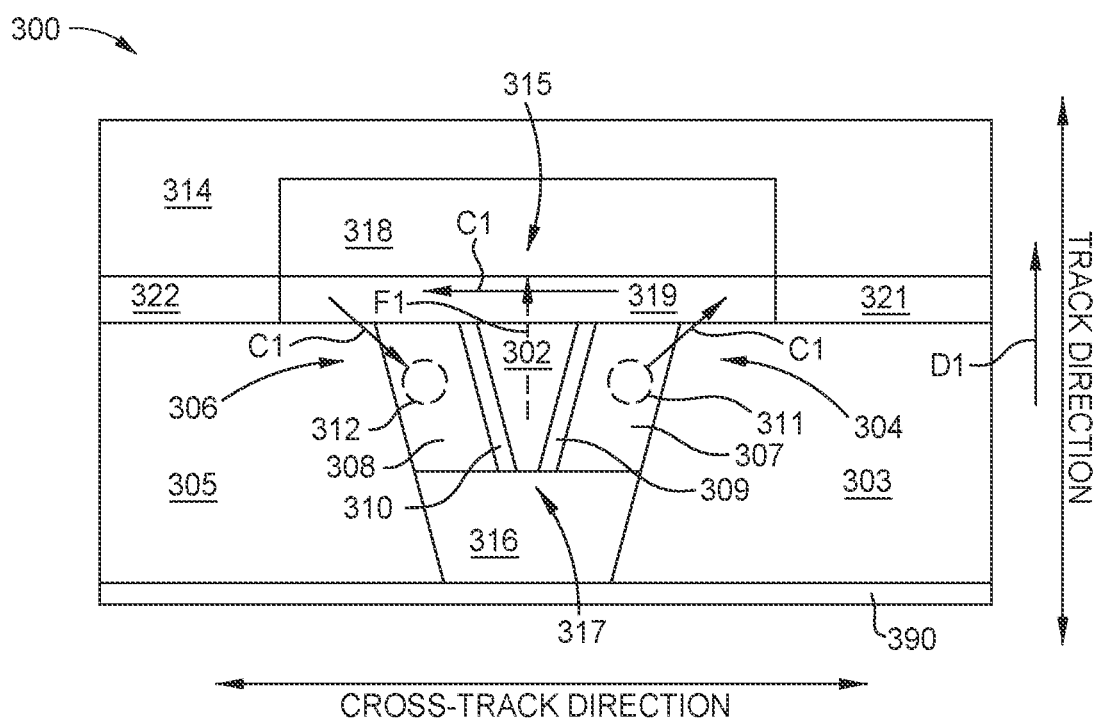
FIG. 3C is a schematic media facing surface cross-sectional view of the magnetic recording head shown in FIG. 3B, according to one implementation.

FIG. 3C is a schematic media facing surface cross-sectional view of the magnetic recording head 300 shown in FIG. 3B, according to one implementation. The magnetic recording head 300 includes the trailing shield 314 disposed on the trailing side 315 of the main pole 302, and a leading insulation layer 316 disposed on the leading side 317 of the main pole 302. In one embodiment, which can be combined with other embodiments, the leading insulation layer 316 is formed of the same insulation material(s) as the first side insulation layer 309 and the second side insulation layer 310. The magnetic recording head 300 also includes the leading shield 390 disposed on a leading side of each of the first side shield 303, the second side shield 305, and the leading insulation layer 316. Each of the trailing shield 314, the first side shield 303, and the second side shield 305 is formed of nickel-iron (NiFe). The magnetic recording head 300 includes the hot seed 318 disposed on the trailing side 315 of the main pole 302. The hot seed 318 is formed of cobalt-iron (CoFe). The magnetic recording head 300 includes the nonmagnetic spacer layer 319 disposed on the trailing side 315 of the main pole 302 and between the main pole 302 and the trailing shield 314. The nonmagnetic spacer layer 319 is disposed between the hot seed 318 and the main pole 302. The nonmagnetic spacer layer 319 is formed of ruthenium (Ru). The nonmagnetic spacer layer 319 is of a height H2 (shown in ghost in FIG. 3B) relative to the media facing surface 301 of the magnetic recording head 300 along the stripe height direction. The height H2 is 0.5 microns or less.

A first shield insulation layer 321 is disposed between the first side shield 303 and the trailing shield 314. The first shield insulation layer 321 is disposed on a first side of the nonmagnetic spacer layer 319. A second shield insulation layer 322 is disposed between the second side shield 305 and the trailing shield 314. The second shield insulation layer 322 is disposed on a second side of the nonmagnetic spacer layer 319. The main pole 302 is disposed on a leading side of the nonmagnetic spacer layer 319, and the hot seed 318 is disposed on a trailing side of the nonmagnetic spacer layer 319.

Each of the first lead 311 and the second lead 312 is coupled to a current source (such as the AC source 383 shown in FIG. 3A) that supplies current C1 to the magnetic recording head 300 (independently of the write current) to facilitate writing using the magnetic recording head 300. The current C1 is alternating current (AC) or direct current (DC). The current C1 is supplied to the first side gap layer 307 using the first lead 311. The current C1 flows from the first side gap layer 307 and to the nonmagnetic spacer layer 319. At least part of the current C1 may flow through the first side shield 303 as the current C1 flows from the first side gap layer 307 and to the nonmagnetic spacer layer 319. The current C1 is directed horizontally through the nonmagnetic spacer layer 319 as the current C1 flows through the nonmagnetic spacer layer 319. The current C1 is directed horizontally along a cross-track direction through the nonmagnetic spacer layer 319 on the trailing side 315 of the main pole 302. The current C1 is directed horizontally along the cross-track direction on the trailing side 315 of the main pole 302 close to the media facing surface 301, such as within the height H4 relative to the media facing surface 301. The current loop for the current C1 is closed adjacent the media facing surface 301, such as within the height H4 relative to the media facing surface 301. The current C1 flows from the nonmagnetic spacer layer 319 and to the second side gap layer 308. At least part of the current C1 may flow through the second side shield 305 as the current C1 flows from the nonmagnetic spacer layer 319 and to the second side gap layer 308. Upon flowing into the second side gap layer 308, the current C1 exits through the second lead 312.

The current C1 flows in a rotational direction about the first side 304, the trailing side 315, and the second side 306 of the main pole 302. The current C1 flows on the trailing side 315 of the main pole 302, and current C1 flow on the leading side 317 of the main pole 302 is reduced or eliminated. The current C1 supplied about the main pole 302 facilitates generating a bias field to facilitate enhanced writing operations of the magnetic recording head 300. The current C1 is a bias current (a secondary current) that is supplied independently of the write current that generates the write field. In one embodiment, which can be combined with other embodiments, the current C1 is supplied at a bias frequency within a range of 0 GHz to 25 GHz (such as within a range of 10 GHz to 25 GHz), and the write current is supplied at a write frequency within a range of 1.0 GHz to 1.5 GHz as a 1T frequency.

The current C1 directed horizontally (e.g., along the cross-track direction) facilitates generating the bias field that includes a magnetic field component F1 in a downtrack direction D1. The magnetic field component F1 generated in the downtrack direction D1 facilitates writer performance for the magnetic recording head 300, and facilitates increased areal density capability (ADC) and reduced jitter. As an example, the magnetic field component F1 in the downtrack direction D1 facilitates writing performance at operating bias current densities (such as an operating bias current density within a range of 300 MA/cm$^2$ to 400 MA/cm$^2$) and operating bias frequencies (such as an operating bias frequency within a range of 0 GHz to 25 GHz) to reduce the probability of overheating the magnetic recording head 300, thereby facilitating reliability and a reduced probability of writer failure.

Figure 4:
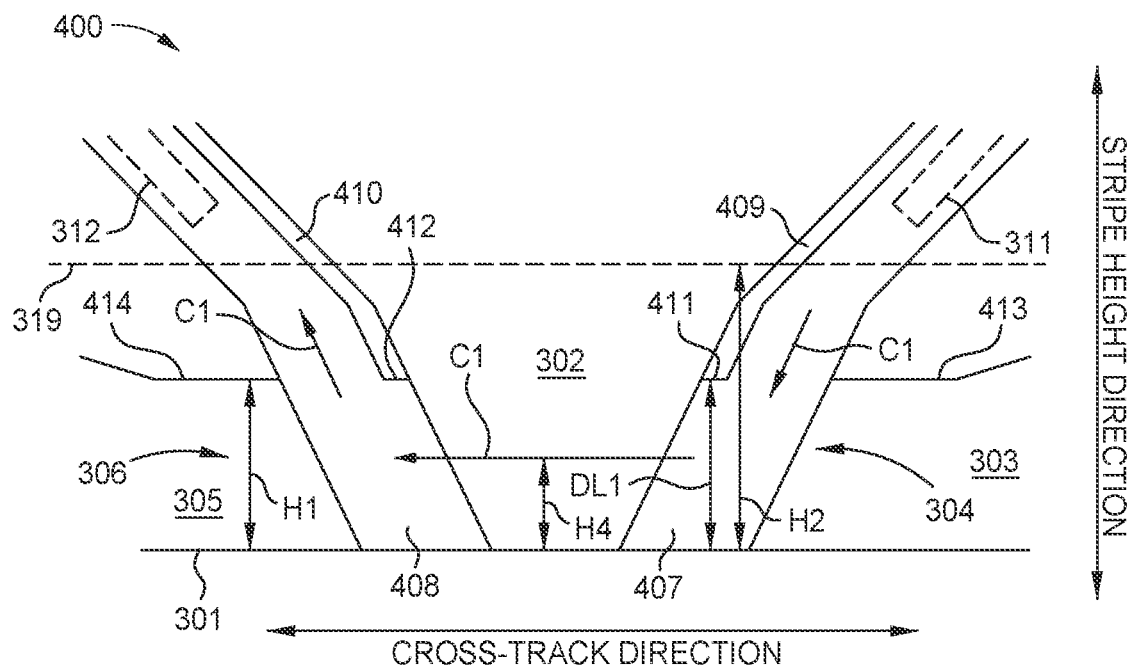
FIG. 4 is a schematic cross-track cross-sectional view of a magnetic recording head, according to one implementation.

FIG. 4 is a schematic cross-track cross-sectional view of a magnetic recording head 400, according to one implementation. The magnetic recording head 400 is similar to the magnetic recording head 300 shown in FIGS. 3B and 3C, and includes one or more of the aspects, features, components, and/or properties thereof.

The magnetic recording head 400 includes a first side gap layer 407 that is similar to the first side gap layer 307 shown in FIGS. 3B and 3C, and a second side gap layer 408 that is similar to the second side gap layer 308 shown in FIGS. 3B and 3C. The magnetic recording head 400 includes a first side insulation layer 409 that is similar to the first side insulation layer 309 shown in FIGS. 3B and 3C, and a second side insulation layer 410 that is similar to the second side insulation layer 310 shown in FIGS. 3B and 3C. The first side insulation layer 409 and the second side insulation layer 410 are each recessed into the magnetic recording head 400 to be at a distance DL1 from the media facing surface 301 along a stripe height direction of the magnetic recording head 400. Each of the first side shield 303 and the second side shield 305 is formed at a height H1 relative to the media facing surface 301. The distance DL1 is equal to or greater than the height H1 of the first side shield 303 and/or the second side shield 305. In one embodiment, which can be combined with other embodiments, the distance DL1 is greater than 10 nm, such as about 15 nm. The distance DL1 is measured between the media facing surface 301 and lower edges 411, 412, respectively, of the first and second side insulation layers 409, 410. The height H1 is measured between the media facing surface 301 and lowermost upper edges 413, 414, respectively, of the first and second side shields 303, 305. Similar to what is described for the magnetic recording head 300 in relation to FIGS. 3B and 3C, the current C1 can be directed horizontally along a cross-track direction on the trailing side of the main pole 302 in the magnetic recording head 400, close to the media facing surface 301. The current C1 directed horizontally (e.g., along the cross-track direction) facilitates generating the bias field that includes the magnetic field component F1 in the downtrack direction D1 (as shown in FIG. 3C).

In the implementation shown in FIG. 4, the current C1 can also flow through the main pole 302 as the current C1 flows along the cross-track direction (in addition to the current C1 flow through the nonmagnetic spacer layer 319 shown in FIG. 3C) due to recessed aspects of the first and second side insulation layers 409, 410. In the implementation shown in FIG. 4, the main pole 302 provides a second possible flow path, in addition to a first possible flow path provided by the nonmagnetic spacer layer 319, which is shown in FIG. 3C.

Figure 5:
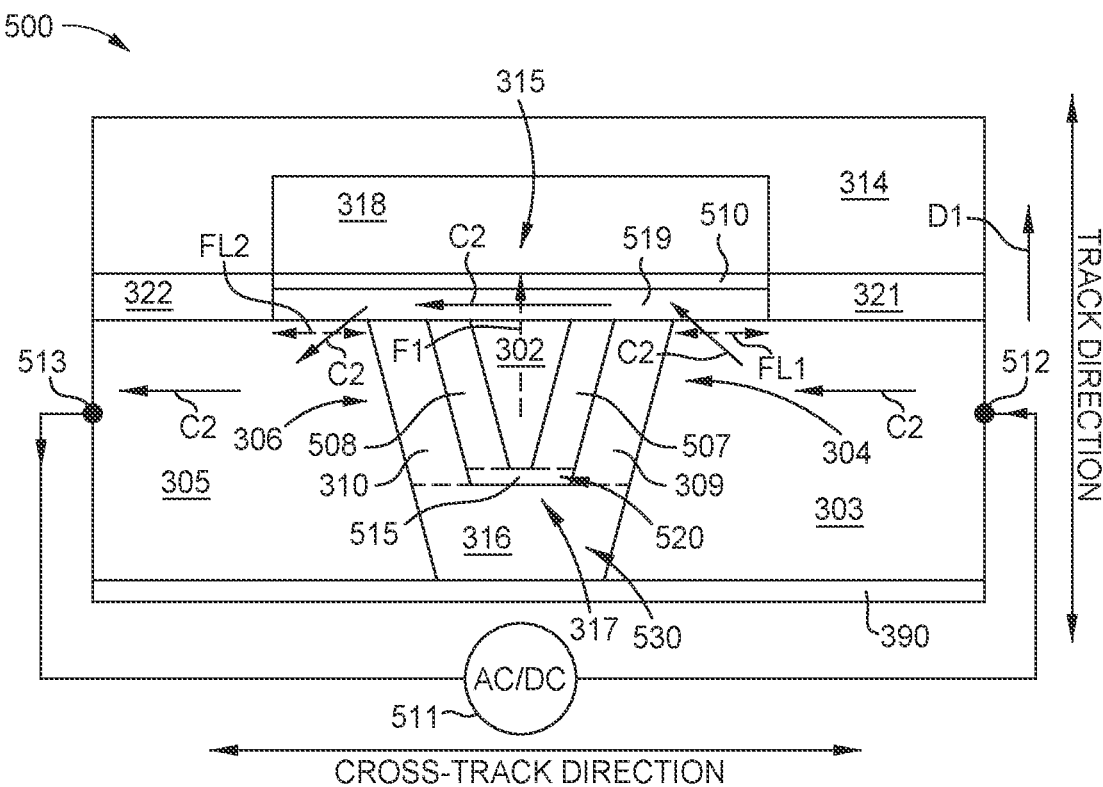
FIG. 5 is a schematic media facing surface cross-sectional view of a magnetic recording head, according to one implementation.

FIG. 5 is a schematic media facing surface cross-sectional view of a magnetic recording head 500, according to one implementation. The magnetic recording head 500 is similar to the magnetic recording head 300 shown in FIGS. 3B and 3C, and includes one or more of the aspects, features, components, and/or properties thereof.

The magnetic recording head 500 includes a first side gap layer 507 disposed on the first side 304 and a second side gap layer 508 disposed on the second side 306. The first side insulation layer 309 is disposed between the first side gap layer 507 and the first side shield 303. The second side insulation layer 310 is disposed between the second side gap layer 508 and the second side shield 305. Each of the first side gap layer 507 and the second side gap layer 508 is formed of ruthenium (Ru) and a heat sink material. The heat sink material includes a low resistivity material, such as copper (Cu) and/or gold (Au). The magnetic recording head 500 includes a trailing insulation layer 510 on the trailing side 315 of the main pole 302. The magnetic recording head 500 includes a nonmagnetic spacer layer 519. The nonmagnetic spacer layer 519 is similar to the nonmagnetic spacer layer 319 shown in FIGS. 3B and 3C, and includes one or more of the aspects, features, components, and/or properties thereof. The nonmagnetic spacer layer 519 may include a length along the track direction that is shorter than a length along the track direction of the nonmagnetic spacer layer 319 due to the space occupied by the trailing insulation layer 510. The trailing insulation layer 510 is disposed between the nonmagnetic spacer layer 519 and the trailing shield 314. The first shield insulation layer 321 is disposed at a first overhang length FL1 from the first side insulation layer 309 along the cross-track direction, and the second shield insulation layer 322 is disposed at a second overhang length FL2 from the second side insulation layer 310 along the cross-track direction. In one embodiment, which can be combined with other embodiments, the second overhand length FL2 is equal to the first overhang length FL1.

The magnetic recording head 500 includes a current source 511 that supplies current C2 to the magnetic recording head 500. The current source 511 is an AC current source or a DC current source. The current C2 is a bias current (a secondary current) that is supplied independently of the write current that generates the write field. The current source 511 is coupled to the first side shield 303 through a first lead 512 and is coupled to the second side shield 305 through a second lead 513. The current source 511 is disposed externally to the first side shield 303, the second side shield 305, and the trailing shield 314, and the leading insulation layer 316. The current source 511 is a second current source (a secondary current source) that is used in addition to a first current source (a primary current source) that supplies the write current to drive writing operations (such as write current supplied to the coil 218).

The first lead 512 is coupled to and/or formed in the first side shield 303. The second lead 513 is coupled to and/or formed in the second side shield 305. The current C2 is similar to the current C1 shown in FIGS. 3B and 3C. The current C2 is supplied into the first side shield 303 through the first lead 512, and flows through the first side shield 303 to the nonmagnetic spacer layer 519. The current C2 flows into the nonmagnetic spacer layer 519 between the first side insulation layer 309 and the first shield insulation layer 321 along the first overhang length FL1. The current C2 flows horizontally along the cross-track direction through the nonmagnetic spacer layer 519 and to the second side shield 305. The trailing insulation layer 510 facilitates directing the current C2 horizontally along the cross-track direction through the nonmagnetic spacer layer 519. The current C2 flows into the second side shield 305 between the second side insulation layer 310 and the second shield insulation layer 322 along the second overhang length FL2. The current C2 flows through the second side shield 305, and exits through the second lead 513. The current C2 flows in a rotational direction about the first side 304, the trailing side 315, and the second side 306 of the main pole 302.

In one embodiment, which can be combined with other embodiments, the magnetic recording head 500 includes a leading gap layer 515 disposed on the leading side 317 of the main pole 302. In one embodiment, which can be combined with other embodiments, the leading gap layer 515 is formed of the same material(s) as the first side gap layer 507 and the second side gap layer 508. In one embodiment, which can be combined with other embodiments, the leading gap layer 515, the first side gap layer 507, and the second side gap layer 508 are part of an integral gap layer 520 disposed about the first side 304 of the main pole 302, the second side 306 of the main pole 302, and the leading side 317 of the main pole 302. In one embodiment, which can be combined with other embodiments, the leading insulation layer 316, the first side insulation layer 309, and the second side insulation layer 310 are part of an integral insulation layer 530 disposed about a first side (corresponding to the first side 304) of the integral gap layer 520, a second side (corresponding to the second side 306) of the integral gap layer 520, and a leading side (corresponding to the leading side 317) of the integral gap layer 520. The integral gap layer 520 is a heat sink layer that concentrates heat into the integral gap layer 520 and away from the main pole 302.

The present disclosure contemplates that the positions of the integral gap layer 520 (and/or the associated leading gap layer 515, the first side gap layer 507, and/or the second side gap layer 508) and the integral insulation layer 530 (and/or the associated leading insulation layer 316, the first side insulation layer 309, and/or the second side insulation layer 310) may be swapped.

Figure 6:
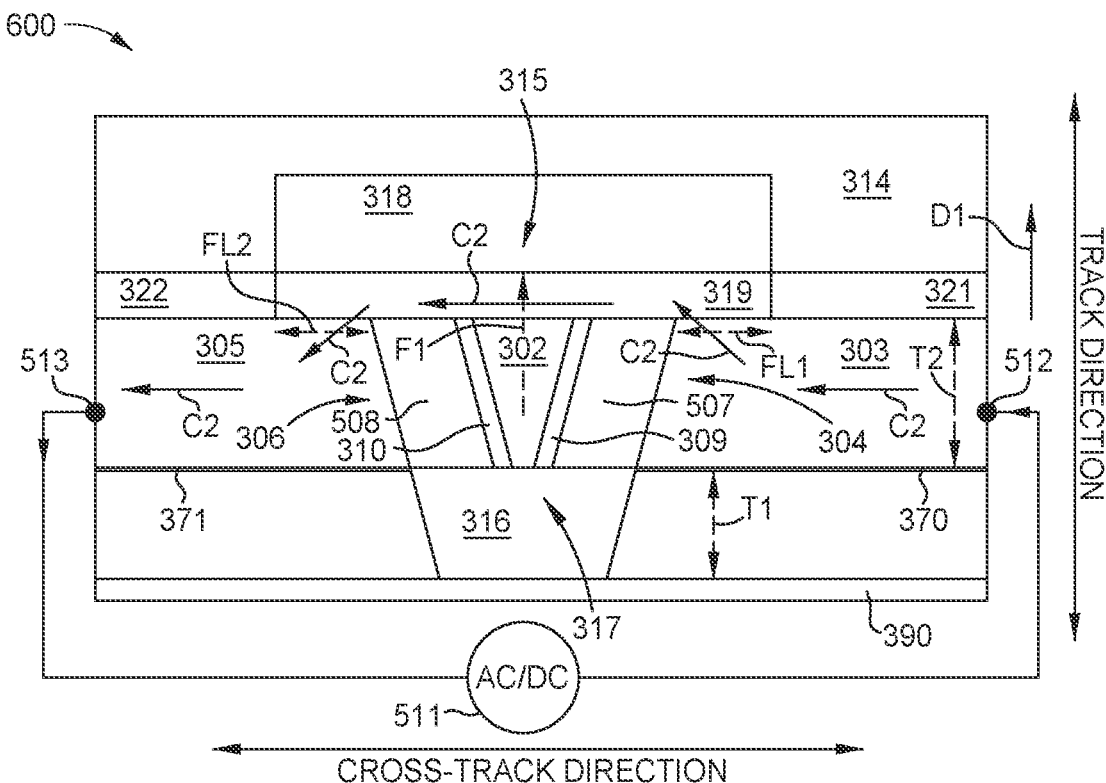
FIG. 6 is a schematic media facing surface cross-sectional view of a magnetic recording head, according to one implementation.

FIG. 6 is a schematic media facing surface cross-sectional view of a magnetic recording head 600, according to one implementation. The magnetic recording head 600 is similar to the magnetic recording head 300 shown in FIGS. 3B and 3C and the magnetic recording head 500 shown in FIG. 5, and includes one or more of the aspects, features, components, and/or properties thereof.

In the implementation shown in FIG. 6, the first side gap layer 507 and the second side gap layer 508 are included and the leading gap layer 515 is omitted. The present disclosure contemplates that the positions of the first and second side gap layers 507, 508 may be swapped with the positions of the first and second side insulation layers 309, 310.

The present disclosure contemplates that in implementations where a trailing insulation layer is not disposed on the trailing side of the nonmagnetic spacer layer 319, portions of the current C2 may flow through the hot seed 318 and/or the trailing shield 314, and return through the second overhang length FL2 and through the second side shield 305.

The first side shield 303 includes an insulation layer 370 embedded in the first side shield 303 to define a current flow boundary for the first side shield 303, and the second side shield 305 includes an insulation layer 371 embedded in the second side shield 305 to define a current flow boundary for the second side shield 305. The embedded insulation layers 370, 371 are lower flow limits of the respective first and second side shield 303, 305 below which the current C2 will not flow as the current C2 flows through the respective first or second side shield 303, 305. The embedded insulation layers 370, 371 are disposed at a first thickness T1 along the track direction. The first thickness T1 is relative to the leading shield 390. In one embodiment, which can be combined with other embodiments, the first thickness T1 is within a range of 35 nm to 100 nm. In one example, the first thickness T1 is equal to a total width along the cross-track direction, and the total width includes a width of the first side gap layer 507 and a width of the first side insulation layer 309 added together.

The embedded insulation layers 370, 371 are disposed at a second thickness T2 along the track direction. The second thickness T2 is relative to the nonmagnetic spacer layer 319. In one embodiment, which can be combined with other embodiments, the second thickness T2 is within a range of 50 nm to 150 nm. In one example, the second thickness T2 is equal to a thickness of the main pole 302.

Figure 7:
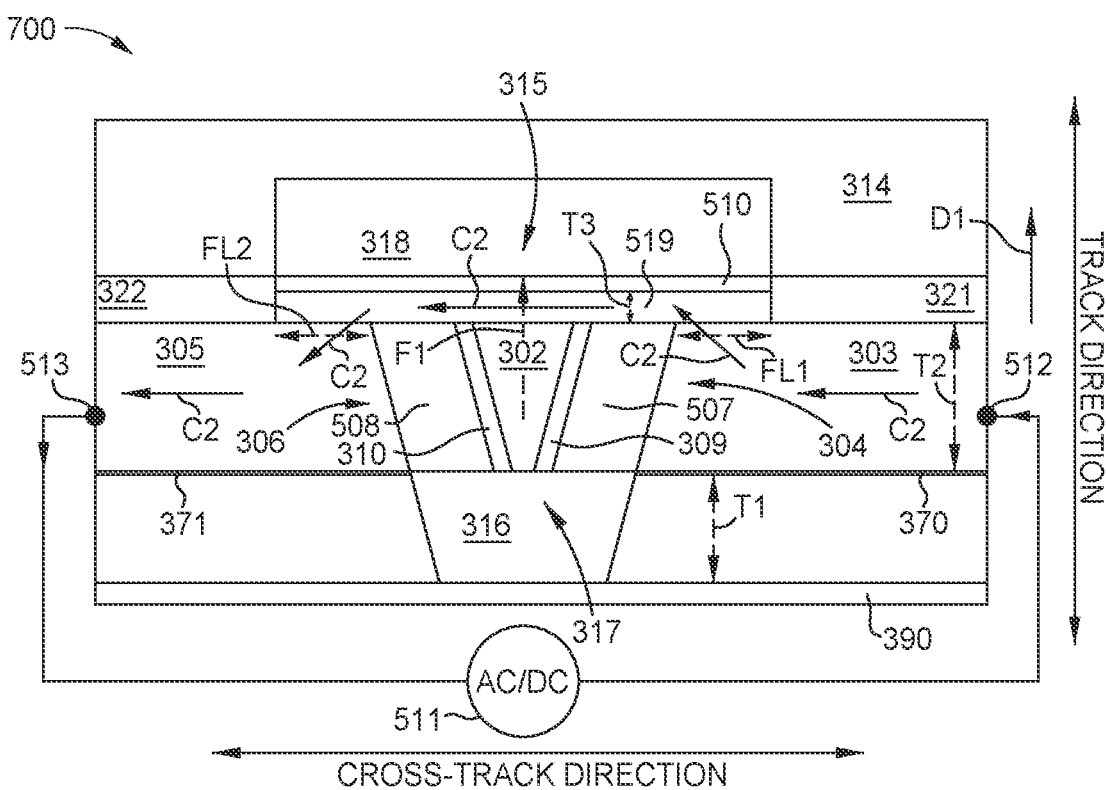
FIG. 7 is a schematic media facing surface cross-sectional view of a magnetic recording head, according to one implementation.

FIG. 7 is a schematic media facing surface cross-sectional view of a magnetic recording head 700, according to one implementation. The magnetic recording head 700 is similar to the magnetic recording head 600 shown in FIG. 6 and the magnetic recording head 500 shown in FIG. 5, and includes one or more of the aspects, features, components, and/or properties thereof. The magnetic recording head 700 includes the trailing insulation layer 510 disposed between the nonmagnetic spacer layer 519 and the hot seed 318. The nonmagnetic spacer layer 519 is of a thickness T3. The thickness T3 is within a range of 15 nm to 30 nm.

The present disclosure contemplates that the positions of the first and second side gap layers 507, 508 may be swapped with the positions of the first and second side insulation layers 309, 310.

Figure 8A:
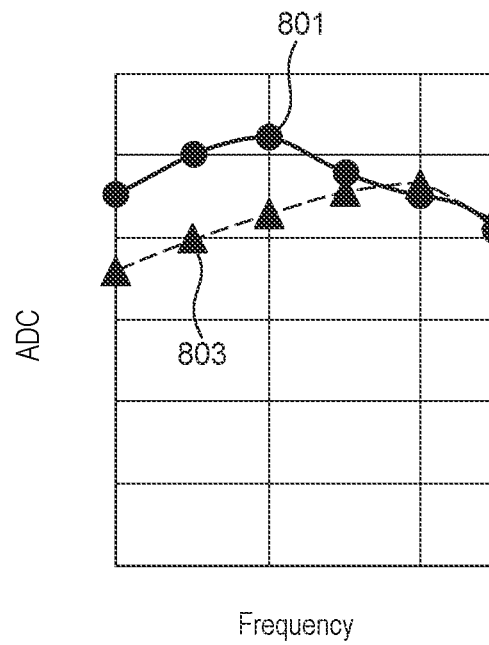
FIG. 8A is a schematic graph showing ADC (Areal Density Capability) relative to frequency, according to one implementation.

FIG. 8A is a schematic graph showing ADC (Areal Density Capability) relative to frequency, according to one implementation. A first case 801 plots the ADC of a magnetic recording head where, close to a media facing surface, a bias current is directed horizontally along the cross-track direction through a nonmagnetic spacer layer on the trailing side of the main pole. For the first case 801, the frequency of the horizontal axis is a frequency for the bias current. A second case 803 plots the ADC of a magnetic recording head having a field-generating layer (FGL) within a spin torque oscillator (STO) in the write gap rather than the cross-track current implementation of the first case 801. For the second case 803, the frequency of the horizontal axis is a frequency of a current applied to the STO with the field-generating layer (FGL). The first case 801 exhibits a higher ADC relative to the second case 803 across a range of frequencies, such as a range of 0 GHz to 25 GHz (for example a range of 10 GHz to 20 GHz).

Figure 8B:
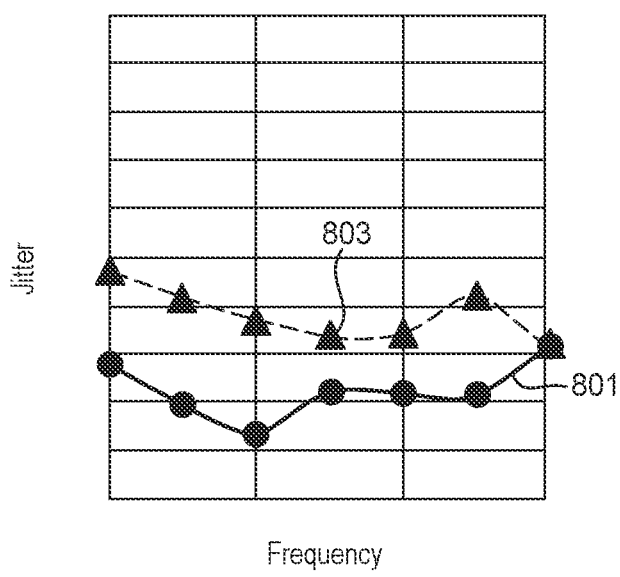
FIG. 8B is a schematic graph showing jitter relative to frequency, according to one implementation.

FIG. 8B is a schematic graph showing jitter relative to frequency, according to one implementation. The first case 801 plots the jitter of the magnetic recording head described in relation to FIG. 8A where, close to the media facing surface, a bias current is directed horizontally along the cross-track direction through the nonmagnetic spacer layer on the trailing side of the main pole. For the first case 801, the frequency of the horizontal axis is a frequency for the bias current. The second case 803 plots the jitter of the magnetic recording head described in relation to FIG. 8A having a field-generating layer (FGL) within a spin torque oscillator (STO) in the write gap rather than the cross-track current implementation of the first case 801. For the second case 803, the frequency of the horizontal axis is a frequency of a current applied to the STO with the field-generating layer (FGL). The first case 801 exhibits a lower jitter relative to the second case 803 across a range of frequencies, such as a range of 0 GHz to 25 GHz (for example a range of 10 GHz to 25 GHz).

Benefits of the present disclosure include simple and effective facilitated magnetic recording performance and reliability; increased ADC for magnetic recording at operating write current densities; reduced jitter; closing a bias current loop close to the media facing surface; reduced write voltage or write current while maintaining or facilitating increased moment-thickness product; and reduced probability of failure at operating write current densities.

It is contemplated that one or more aspects disclosed herein may be combined. Moreover, it is contemplated that one or more aspects disclosed herein may include some or all of the aforementioned benefits. As an example, aspects, components, features, and/or properties of the various magnetic recording heads 300, 400, 500, 600, 700 described herein may be combined for a magnetic recording head (such as a write head of an HDD).

In one embodiment, a magnetic recording head comprises a main pole, a first side shield disposed on a first side of the main pole, a second side shield disposed on a second side of the main pole, and a trailing shield disposed on a trailing side of the main pole. The magnetic recording head also includes a first side gap layer disposed on the first side of the main pole and between the main pole and the first side shield. The first side gap layer includes a first lead. The magnetic recording head also includes a first side insulation layer disposed on the first side of the main pole and between the main pole and the first side gap layer. The magnetic recording head also includes a second side gap layer disposed on the second side of the main pole and between the main pole and the second side shield. The second side gap layer includes a second lead. The magnetic recording head also includes a second side insulation layer disposed on the second side of the main pole and between the main pole and the second side gap layer. Each of the first side gap layer and the second side gap layer is formed of ruthenium. The magnetic recording head also includes a hot seed disposed on the trailing side of the main pole. The hot seed is formed of cobalt-iron. The magnetic recording head also includes a nonmagnetic spacer layer disposed on the trailing side of the main pole and between the main pole and the trailing shield. The nonmagnetic spacer layer is formed of ruthenium. In one embodiment, which can be combined with other embodiments, the magnetic recording head includes a first shield insulation layer disposed between the first side shield and the trailing shield, and a second shield insulation layer disposed between the second side shield and the trailing shield. The first shield insulation layer is disposed on a first side of the nonmagnetic spacer layer, and the second shield insulation layer is disposed on a second side of the nonmagnetic spacer layer. The magnetic recording head includes a media facing surface. In one embodiment, which can be combined with other embodiments, the first side insulation layer and the second side insulation layer extend to the media facing surface along a stripe height direction of the magnetic recording head. In one embodiment, which can be combined with other embodiments, the first side insulation layer and the second side insulation layer are recessed into the magnetic recording head to be at a distance from the media facing surface along a stripe height direction of the magnetic recording head. The distance is equal to or greater than a height of the first side shield along the stripe height direction. A magnetic recording device including the magnetic recording head is also disclosed. In one example, the magnetic recording device includes the current source, and a control unit configured to drive the current source to generate an alternating bias current via the first and second leads. In one example, the magnetic recording head includes a write current source supplying a write current to coils of the main pole, and the control unit is further configured to drive the alternating bias current at a frequency within a range of 0 GHz to 25 GHz, and drive the write current applied to the coils of the main pole at a frequency within a range of 1.0 GHz to 1.5 GHz.

In one embodiment, a magnetic recording head comprises a main pole, a first side shield disposed on a first side of the main pole, a second side shield disposed on a second side of the main pole, and a trailing shield disposed on a trailing side of the main pole. The magnetic recording head also includes a first side gap layer disposed on the first side of the main pole, a first side insulation layer disposed on the first side of the main pole and between the first side gap layer and the first side shield, and a second side gap layer disposed on the second side of the main pole. The magnetic recording head also includes a second side insulation layer disposed on the second side of the main pole and between the second side gap layer and the second side shield. The magnetic recording head also includes a first shield insulation layer disposed between the first side shield and the trailing shield, and a second shield insulation layer disposed between the second side shield and the trailing shield. The first shield insulation layer is disposed at a first overhang length from the first side insulation layer along a cross-track direction, and the second shield insulation layer is disposed at a second overhang length from the second side insulation layer along the cross-track direction. The magnetic recording head also includes a current source coupled to the first side shield and the second side shield through a first lead and a second lead. The magnetic recording head also includes a nonmagnetic spacer layer disposed on the trailing side of the main pole and between the main pole and the trailing shield. In one embodiment, which can be combined with other embodiments, the first side gap layer and the second side gap layer are part of an integral gap layer disposed about the first side of the main pole, the second side of the main pole, and a leading side of the main pole. In one embodiment, which can be combined with other embodiments, the first side insulation layer and the second side insulation layer are part of an integral insulation layer disposed about a first side of the integral gap layer, a second side of the integral gap layer, and a leading side of the integral gap layer. A magnetic recording device including the magnetic recording head is also disclosed.

In one embodiment, a magnetic recording head comprises a main pole, a first side shield disposed on a first side of the main pole, and a second side shield disposed on a second side of the main pole. The magnetic recording head also includes a trailing shield disposed on a trailing side of the main pole, and one or more side gap layers disposed on the first side of the main pole and the second side of the main pole. The magnetic recording head also includes one or more side insulation layers disposed on the first side of the main pole and the second side of the main pole, and a nonmagnetic spacer layer disposed on the trailing side of the main pole and between the main pole and the trailing shield. The magnetic recording head also includes a trailing insulation layer on the trailing side of the main pole and between the nonmagnetic spacer layer and the trailing shield. The nonmagnetic spacer layer is of a height relative to a media facing surface of the magnetic recording head along a stripe height direction. The height is 0.5 microns or less. A magnetic recording device including the magnetic recording head is also disclosed.

While the foregoing is directed to embodiments of the present disclosure, other and further embodiments of the disclosure may be devised without departing from the basic scope thereof, and the scope thereof is determined by the claims that follow.

What is claimed is:
1. A magnetic recording head, comprising:
a main pole;
a first side shield disposed on a first side of the main pole;
a second side shield disposed on a second side of the main pole;

a trailing shield disposed on a trailing side of the main pole;
a first side gap layer disposed on the first side of the main pole and between the main pole and the first side shield, the first side gap layer comprising a first lead coupled to a current source;
a first side insulation layer disposed on the first side of the main pole and between the main pole and the first side gap layer;
a second side gap layer disposed on the second side of the main pole and between the main pole and the second side shield, the second side gap layer comprising a second lead coupled to the current source; and
a second side insulation layer disposed on the second side of the main pole and between the main pole and the second side gap layer.

2. The magnetic recording head of claim 1, wherein each of the first side gap layer and the second side gap layer is formed of ruthenium.

3. The magnetic recording head of claim 1, further comprising a hot seed disposed on the trailing side of the main pole, wherein the hot seed is formed of cobalt-iron.

4. The magnetic recording head of claim 1, further comprising a nonmagnetic spacer layer disposed on the trailing side of the main pole and between the main pole and the trailing shield.

5. The magnetic recording head of claim 4, wherein the nonmagnetic spacer layer is formed of ruthenium.

6. The magnetic recording head of claim 4, further comprising a first shield insulation layer disposed between the first side shield and the trailing shield, and a second shield insulation layer disposed between the second side shield and the trailing shield, wherein the first shield insulation layer is disposed on a first side of the nonmagnetic spacer layer, and the second shield insulation layer is disposed on a second side of the nonmagnetic spacer layer.

7. The magnetic recording head of claim 1, further comprising a media facing surface, wherein the first side insulation layer and the second side insulation layer extend to the media facing surface along a stripe height direction of the magnetic recording head.

8. The magnetic recording head of claim 1, further comprising a media facing surface, wherein the first side insulation layer and the second side insulation layer are recessed into the magnetic recording head to be at a distance from the media facing surface along a stripe height direction of the magnetic recording head.

9. The magnetic recording head of claim 8, wherein the distance is equal to or greater than a height of the first side shield along the stripe height direction.

10. A magnetic recording device comprising:
the magnetic recording head of claim 1;
the current source; and
a control unit configured to drive the current source to generate an alternating bias current via the first and second leads.

11. The magnetic recording head of claim 10, further comprising a write current source supplying a write current to coils of the main pole, wherein the control unit is further configured to:
drive the alternating bias current at a frequency within a range of 0 GHz to 25 GHz; and
drive the write current applied to the coils of the main pole at a frequency within a range of 1.0 GHz to 1.5 GHz.

12. A magnetic recording head, comprising:
a main pole;
a first side shield disposed on a first side of the main pole;
a second side shield disposed on a second side of the main pole;
a trailing shield disposed on a trailing side of the main pole;
a first side gap layer disposed on the first side of the main pole;
a first side insulation layer disposed on the first side of the main pole and between the first side gap layer and the first side shield;
a second side gap layer disposed on the second side of the main pole;
a second side insulation layer disposed on the second side of the main pole and between the second side gap layer and the second side shield; and
a current source coupled to the first side shield and the second side shield through a first lead and a second lead.

13. The magnetic recording head of claim 12, further comprising a first shield insulation layer disposed between the first side shield and the trailing shield, and a second shield insulation layer disposed between the second side shield and the trailing shield, wherein the first shield insulation layer is disposed at a first overhang length from the first side insulation layer along a cross-track direction, and the second shield insulation layer is disposed at a second overhang length from the second side insulation layer along the cross-track direction.

14. The magnetic recording head of claim 12, further comprising a nonmagnetic spacer layer disposed on the trailing side of the main pole and between the main pole and the trailing shield.

15. The magnetic recording head of claim 12, wherein:
the first side gap layer and the second side gap layer are part of an integral gap layer disposed about the first side of the main pole, the second side of the main pole, and a leading side of the main pole;
the integral gap layer is formed of ruthenium (Ru) and a heat sink material; and
the first side insulation layer and the second side insulation layer are part of an integral insulation layer disposed about a first side of the integral gap layer, a second side of the integral gap layer, and a leading side of the integral gap layer.

16. A magnetic recording device comprising the magnetic recording head of claim 12.

17. A magnetic recording head, comprising:
a main pole;
a first side shield disposed on a first side of the main pole;
a second side shield disposed on a second side of the main pole;
a trailing shield disposed on a trailing side of the main pole;
one or more side gap layers disposed on the first side of the main pole and the second side of the main pole;
one or more side insulation layers disposed on the first side of the main pole and the second side of the main pole; and
a nonmagnetic spacer layer disposed on the trailing side of the main pole and between the main pole and the trailing shield,
wherein the nonmagnetic spacer layer is of a height relative to a media facing surface of the magnetic recording head along a stripe height direction, and the height is 0.5 microns or less.

18. The magnetic recording head of claim 17, further comprising a trailing insulation layer on the trailing side of the main pole and between the nonmagnetic spacer layer and the trailing shield.

19. A magnetic recording device comprising the magnetic recording head of claim 17.

20. A magnetic recording head, comprising:
a main pole;
a first side shield disposed on a first side of the main pole;
a second side shield disposed on a second side of the main pole;
a trailing shield disposed on a trailing side of the main pole;
a first side gap layer disposed on the first side of the main pole;
a first side insulation layer disposed on the first side of the main pole and between the first side gap layer and the first side shield;
a second side gap layer disposed on the second side of the main pole;
a second side insulation layer disposed on the second side of the main pole and between the second side gap layer and the second side shield;
a first shield insulation layer disposed between the first side shield and the trailing shield; and
a second shield insulation layer disposed between the second side shield and the trailing shield,
wherein the first shield insulation layer is disposed at a first overhang length from the first side insulation layer along a cross-track direction, and the second shield insulation layer is disposed at a second overhang length from the second side insulation layer along the cross-track direction.

21. A magnetic recording head, comprising:
a main pole;
a first side shield disposed on a first side of the main pole;
a second side shield disposed on a second side of the main pole;
a trailing shield disposed on a trailing side of the main pole;
a first side gap layer disposed on the first side of the main pole;
a first side insulation layer disposed on the first side of the main pole and between the first side gap layer and the first side shield;
a second side gap layer disposed on the second side of the main pole, wherein the first side gap layer and the second side gap layer are part of an integral gap layer disposed about the first side of the main pole, the second side of the main pole, and a leading side of the main pole, and the integral gap layer is formed of ruthenium (Ru) and a heat sink material; and
a second side insulation layer disposed on the second side of the main pole and between the second side gap layer and the second side shield, wherein the first side insulation layer and the second side insulation layer are part of an integral insulation layer disposed about a first side of the integral gap layer, a second side of the integral gap layer, and a leading side of the integral gap layer.

\* \* \* \* \*